(12) United States Patent
Lamantia et al.

(10) Patent No.: US 8,990,796 B2
(45) Date of Patent: Mar. 24, 2015

(54) METHOD OF AUTOMATED OPERATING SYSTEM DEPLOYMENT FOR A NETWORK OF MULTIPLE DATA PROCESSORS

(76) Inventors: Thomas Lamantia, Wheaton, IL (US); Derek Fournier, Valrico, FL (US); Rick Schendelman, Henderson, NV (US); Kyle Haroldsen, Aurora, IL (US); Alan Batson, Frankfort, IL (US); Phuoc Lieu, Bolingbrook, IL (US); Justin Merritt, Clearwater, FL (US); Kan Mongwa, Clementon, NJ (US); David Norling-Christensen, Shaker Heights, OH (US); Eric Reiner, St. Charles, IL (US)

(*) Notice: Subject to any disclaimer, the term of this patent is extended or adjusted under 35 U.S.C. 154(b) by 2043 days.

(21) Appl. No.: 11/998,451

(22) Filed: Nov. 29, 2007

(65) Prior Publication Data

US 2009/0144514 A1    Jun. 4, 2009

Related U.S. Application Data

(60) Provisional application No. 61/003,408, filed on Nov. 16, 2007.

(51) Int. Cl.
*G06F 9/44* (2006.01)
*G06F 9/445* (2006.01)
*G06F 12/14* (2006.01)

(52) U.S. Cl.
CPC .................................. *G06F 8/63* (2013.01)
USPC ............................ 717/174; 717/168; 713/191

(58) Field of Classification Search
None
See application file for complete search history.

(56) References Cited

U.S. PATENT DOCUMENTS

| | | | |
|---|---|---|---|
| 6,604,235 B1 * | 8/2003 | Harrison et al. | 717/168 |
| 7,203,937 B1 | 4/2007 | Kyle et al. | |
| 7,343,599 B2 * | 3/2008 | Panjwani | 717/168 |
| 7,565,517 B1 * | 7/2009 | Arbon | 713/1 |
| 7,793,113 B2 * | 9/2010 | Bhogal et al. | 713/191 |
| 8,171,470 B2 * | 5/2012 | Goldman et al. | 717/174 |
| 8,250,560 B2 * | 8/2012 | Hirayama | 717/168 |
| 2003/0097578 A1 * | 5/2003 | England et al. | 713/191 |
| 2003/0233645 A1 * | 12/2003 | Cohen et al. | 717/174 |
| 2005/0086457 A1 | 4/2005 | Hohman | |

(Continued)

OTHER PUBLICATIONS

Vallee et al. System Management Software for Virtual Environments. Proceedings of the 4th international conference on Computing frontiers, May 2007, pp. 153-160. Retrieved from [Oct. 30, 2014] Retrieved from the Internet: URL< http://dl.acm.org/citation.cfm?id=1242555>.*

(Continued)

*Primary Examiner* — Thuy Dao
*Assistant Examiner* — Cheneca Smith
(74) *Attorney, Agent, or Firm* — Greer, Burns & Crain, Ltd.

(57) ABSTRACT

A method of deploying a new operating system on a plurality of data processors. Hardware and driver information is determined from the data processors. A general disk image for all of the data processors is prepared in a preinstallation environment. Hardware and software components for a specific target data processor are added to or associated with the preinstallation environment to create an installation operating system for that data processor. The components of the installation operating system are installed on the target data processor, thereby replacing the data processor's operating system with the new operating system of the preinstallation environment.

12 Claims, 9 Drawing Sheets

(56) References Cited

U.S. PATENT DOCUMENTS

| | | | |
|---|---|---|---|
| 2006/0047974 A1* | 3/2006 | Alpern et al. | 713/191 |
| 2007/0011674 A1* | 1/2007 | Joo et al. | 717/174 |
| 2007/0022285 A1* | 1/2007 | Groth et al. | 713/155 |
| 2007/0028230 A1 | 2/2007 | Goetz et al. | |
| 2007/0046791 A1 | 3/2007 | Wang et al. | |
| 2007/0169112 A1* | 7/2007 | Wu et al. | 717/174 |
| 2008/0092134 A1* | 4/2008 | Zhang et al. | 717/174 |
| 2008/0270781 A1* | 10/2008 | Ibrahim et al. | 713/2 |

OTHER PUBLICATIONS

Potter et al. Reducing downtime due to system maintenance and upgrades.19th LISA. 2005, pp. 47-62, Retrieved on [Oct. 30, 2014] Retrieved from the Internet: URL< http://static.usenix.org/event/lisa05/tech/full_papers/potter/potter_html/>.*

Intrinsic Technologies, LLC, *Swimage User's Guide*, Version 4.1, published prior to Nov. 29, 2007.

* cited by examiner

METHOD OF AUTOMATED OPERATING SYSTEM DEPLOYMENT FOR A NETWORK OF MULTIPLE DATA PROCESSORS

CROSS REFERENCE TO RELATED APPLICATION

This application claims the benefit of U.S. provisional patent application, Ser. No. 61/003,408, filed on 16 Nov. 2007. The co-pending provisional patent application is hereby incorporated by reference herein in its entirety and is made a part hereof, including but not limited to those portions which specifically appear hereinafter.

BACKGROUND OF THE INVENTION

This invention relates generally to a method of upgrading operating systems and, more particularly, to software for implementing the method of upgrading existing or installing new operating systems on data processors.

New operating systems (OS), such as Windows® Vista, appear every few years, and companies must make a determination about when the right time is to adopt the new platform and take advantage of the new environment. A historic challenge has not been in the value proposition of the new OS, but rather in the costs associated with adopting that OS. Since the days of Windows® 3.1, the costs of deploying the OS have rapidly outpaced the cost of the software, leading to an environment where companies are running at least one and sometimes two major revisions back in OS level. This disparity causes maintenance and compatibility issues, not to mention security risks as aging platforms are ridden until they are no longer supported by Microsoft®.

With these problems, there have been attempts to improve the deployment process. From significant improvements like the Windows Image Format to various tools and frameworks, Microsoft® has tried to enable IT organizations via the provision of multiple possible scenarios. This leaves the IT organization to stitch together those tools into a holistic deployment solution, implement it, maintain it, and educate their staff about the new process. Though empowering in that the IT organization can develop a truly custom solution based on these precepts, that end state is not often the one that leads to the lowest cost or the most efficient operation for most companies.

Success in the deployment game is a significant calculation, because success goes far beyond the result of a single piece of software distribution or the provision of free prescriptive architecture guidance. When dealing with a process that is as critical to the success of a company's IT infrastructure as OS deployment, it is imperative that all of the facets of this process are evaluated before choosing a strategic direction. A direction that will go far beyond the initial evaluation of "Can we use this to send out an image," and morphs into a true analysis of how deployment can be converted from a necessary evil into a strategic process: one that rather than driving a cost center can be leveraged as a mechanism to prove the value of a truly optimized IT organization and utilized to drive business value back into the company.

Deployment is often considered, over-simplistically, by many as little more than a big software distribution. Such a definition does not take into consideration many factors. The migration to a new OS can cause a multitude of non-technical issues for a user-base. From training on the new OS usage to migration of data and configuration from the previous OS, the communication and information exchange between the technical team and the target users is beyond necessary: it is critical. Long considered a tangential, non-technical aspect of the process, time has proven that 80% of deployments will go over time estimates and over cost estimates due to these little things that are considered 'non-technical.'

Further difficulties are encountered when a drive and/or a file on the data processor to be upgraded is encrypted. In order to move the encrypted data during OS upgrade and deployment, the drive or file needs to be first decrypted and then re-encrypted upon the deployment. This manual procedure generally requires the assistance of the encryption provider, thereby further complicating and delaying the deployment process.

There is an ongoing need for an improved automated process for upgrading and deploying a new OS for a data processor, and particularly a plurality of data processors in a network.

SUMMARY OF THE INVENTION

A general object of the invention is to provide a method and software for implementing an automated OS deployment process for use with data processors.

The general object of the invention can be attained, at least in part, through a method of deploying a new operating system on a plurality of data processors. The method includes: determining hardware information for each of the plurality of data processors; receiving information identifying the new operating system and applications to be installed on each of the plurality of data processors; creating an installation operating system for one of the plurality of data processors including the new operating system, the installation operating system including a disk image; modifying the installation operating system according to hardware information for the one of the plurality of data processors; modifying the installation operating system to include the applications for the one of the plurality of data processors; and installing the installation operating system on the one of the plurality of data processors as the new operating system. The method is repeated by creating and modifying an installation operating system for each of the plurality of data processors to be upgraded or installed.

The invention further comprehends a method of deploying a new operating system on a data processor having a recordable medium including encrypted data. The method comprises: identifying at least one driver for the encryption algorithm used to encrypt the encrypted data; modifying the new operating system to include the at least one driver; and installing the new operating system with the at least one driver and the encrypted data on the data processor. Desirably, the encrypted data remains encrypted throughout the entire operating system deployment process.

The invention further comprehends a method of deploying a new operating system on a data processor having a recordable medium including encrypted data. The method comprises the steps of: identifying at least one driver for the encryption algorithm used to encrypt the encrypted data; creating an installation operating system including the encrypted data and the at least one driver; modifying the new operating system to include the at least one driver; and installing the new operating system with the at least one driver and the encrypted data on the data processor.

The methods of this invention are desirably implemented automatically by software that is recorded on a computer readable medium, e.g., CD, DVD, hard drive, or flash drive, and that is executable on a data processor, such as a laptop, desktop computer, or a server.

As used herein, references to "operating system" are to be understood to refer to software that manages the sharing of the resources of a computer and provides programmers with an interface used to access those resources. An operating system processes system data and user input, and responds by allocating and managing tasks and internal system resources as a service to users and programs of the system. At the foundation of all system software, an operating system performs basic tasks such as controlling and allocating memory, prioritizing system requests, controlling input and output devices, facilitating networking and managing file systems. Most operating systems come with an application that provides a user interface for managing the operating system, such as a command line interpreter or graphical user interface. The operating system forms a platform for other system software and for application software. Common contemporary desktop operating systems include Microsoft Windows, Mac OS X, and Linux.

As used herein, references to "driver" are to be understood to refer to a computer-readable file or data containing information the operating system needs to interact with a hardware device or software module.

As used herein, references to "disk image" or "image" are to be understood to refer to a file containing an image, e.g., a copy, of the contents of a disk.

Further, references herein to "preinstallation environment" and "installation operating system" are to be understood to refer to a minimal (e.g., minimal features) or "boot" operating system designed to prepare a computer for operating system installation.

Other objects and advantages will be apparent to those skilled in the art from the following detailed description taken in conjunction with the drawings.

DESCRIPTION OF THE INVENTION

Generally stated, this invention is a method of deploying a new operating system (OS) on one or more data processors. The data processors can be stand-alone data processors or connected via a network to a server. The invention will be described below with reference to multiple data processors connected via a server. The method of this invention provides a framework used to increase the simplicity and efficiency of managing the entire OS deployment lifecycle. The method of this invention optimizes and automates manual processes to provide a consistent, repeatable, and scalable process framework for deployments, migrations, and on-going maintenance of data processors such as workstations, laptops, and servers. In one embodiment of this invention, the method is designed to integrate and enhance the capabilities of Microsoft® Systems Management Server ("SMS"), and will be described with reference to SMS below.

Figure 1:
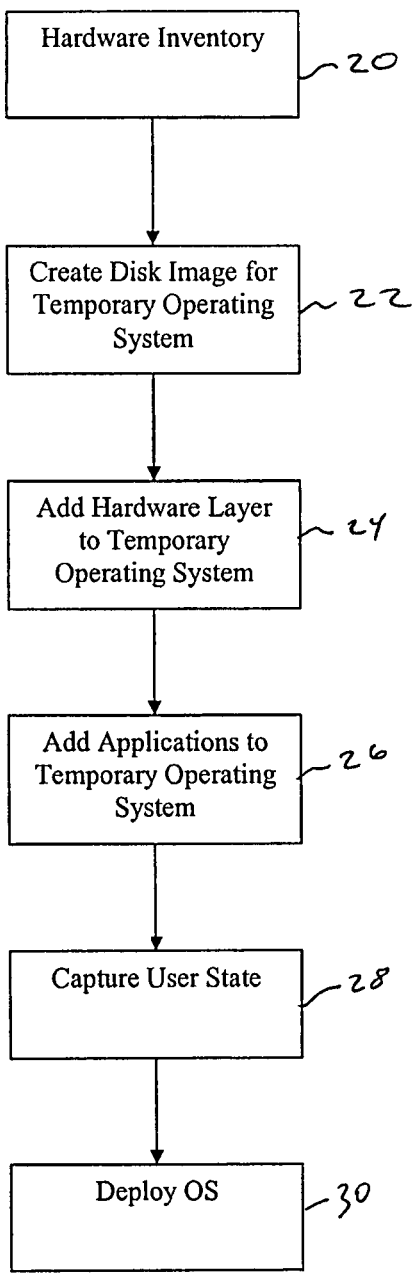
FIG. 1 is a flow diagram illustrating a method of one embodiment of this invention.

FIG. 1 illustrates the general steps of a method of one embodiment of this invention. The method illustrated in FIG. 1 is desirably automatically implemented by software recorded on and executed by one or more data processors, such as a central server. In FIG. 1, the initial step 20 includes identifying the current-state of the hardware environment. Hardware information for each of the data processors on the network will be automatically collected. The information gathered will include hardware information such as processor speed, memory, hard drive sizes, and network cards for the data processors. The hardware information can also include software and settings, such as user names, installed applications, and data usage. A software generated database will maintain the information that is collected through an automated system inventory like SMS. The software and method of this invention extends the capability of SMS by allowing pre-provisioning of systems as well as keeping a migration planning and maintenance database for better track of systems throughout the migration and beyond.

In one embodiment of this invention, in addition to a mere identification of the hardware on each of the data processors, a library of drivers is created from the data processors. The automated OS deployment process copies hardware drivers for the hardware of each of the data processors and stores the hardware drivers in a driver database associated with the method implementing server. These stored hardware drivers can be used to modify the installation operating system as described below. By copying the hardware drivers from the data processors themselves, there is no need to obtain the drivers from the hardware manufacturers.

Implementing the OS deployment for a target data processor uses information on what OS is being deployed and what applications are being installed with the new OS on that data processor. One benefit of this information is for establishing requirements for the data processors. Exemplary requirements necessary for successfully building and deploying the new OS on the data processors include the hardware requirements and the desktop requirements. The inventory previously gathered can be used to generate reports that clearly list the existing hardware specifications. From this list, a threshold can be established to determine what systems will not be supported on the new operating system. One way to determine this threshold is to combine the minimum recommended hardware specifications with user acceptance of performance testing on various hardware models. Hardware that falls below the acceptable threshold can be replaced prior to the deployment and migration according to this invention.

The automated OS deployment process according to one embodiment of this invention creates an installation operating system. The installation operating system can be considered a temporary OS, and will eventually be loaded onto a target data processor as the new operating system for that target data processor. The installation operating system is desirably established remote from the data processor and on a second data processor, such as the method implementing network server that is in communication with each data processor to be updated. The installation operating system includes a disk image, as shown in box 22, of the data processor in a preinstallation environment. Windows® Preinstallation Environment (WinPE) is an exemplary preinstallation environment that is a lightweight version of Windows XP, Windows Server 2003, or Windows Vista, and is commonly used for the deployment of workstations and servers by large corporations. The Windows Imaging Format (WIM) is an exemplary file-based disk image format.

In one embodiment of this invention, the automated OS deployment process creates a base binary image to be deployed to all network data processors. A goal is to create a single image that will be supported on all hardware platforms. This image is desirably created in a lab data processor and tested thoroughly for stability in the environment. The image desirably includes slip-streamed service packs, necessary patches, and any universal components or customizations required by the business. The image generally can include applications as long as the life of the embedded application is longer than the expected of the life of the image itself. The image should not include customizations typically made through group policy. In many cases, this image can be a highly "vanilla" image, with the expectation that the remaining deployment process will provide customizations. Hardware drivers are also not needed in the image. In one embodiment of this invention, the automated process can deploy the necessary hardware drivers required for a data processor at the time of deployment, which not only minimizes the size of the binary image, but will also make it much easier to incorporate new hardware since the image does not need to be altered.

In box 24, the installation operating system for each data processor is modified with the hardware information for that data processor. In one embodiment, the installation operating system includes the single image with a hardware layer applied as a separate component. By having the hardware layer outside of the base image, all current and future hardware can be supported without a need to rebuild the core image. As the hardware layer is a modular component, it can be managed separately from the image. Additionally, each hardware model can be managed independently from each other. Because of this, for each existing or new hardware platform, a setup process is necessary to prepare the hardware layer for each model. In one embodiment of this invention, the hardware layer can be broken down into three main components: BIOS (Basic Input/Output System), Hardware Abstraction Layer (HAL), and hardware drivers. The setup for each of which is typically handled slightly different.

It is generally important that all data processor systems have a level-set and current BIOS. Having a level-set BIOS will eliminate variables in troubleshooting issues on the data processor. Additionally, having a BIOS that is up-to-date may be necessary to install and run the new operating system properly. The second component in the hardware layer is the HAL. An incorrect HAL can cause problems ranging from inefficient power management to a complete failure to boot. The proper HAL is desirably applied just after the image is deployed, and before the data processor boots for the first time. The final hardware layer component includes the hardware drivers. The drivers refer to both the plug-and-play drivers as well as the driver install routines. If a driver has an install associated with it, it must be able to execute with a silent switch to eliminate prompts.

In box 26, the installation operating system is further modified by the automated process of this invention to include an application layer for the target data processor. The application layer is also desirably a separate component from the disk image, and includes applications or information about applications to be installed with the disk image for the target data processor. In one embodiment of this invention, the applications associated with the installation operating system are determined based upon a role of the end user of the data processor. For example, an end user in the accounting department (e.g., an accounting role) would generally require both same and different applications than a programmer in the IT department. However, the role identifications can be further complicated where, for example, accountants in the east coast office require applications both same and different from accountants in a west coast office (or perhaps, accountants in two different divisions of a company).

The process of one embodiment of this invention creates role templates from which the user roles are created. Applications are associated with the role templates, and when particular role templates are combined to create the user role, the associated applications are also combined in the application layer for the user role, and associated with the installation operating system. Referring to the east coast/west coast accounting example, an east coast accountant user role can be a combination of a role template for "east coast user" and a role template for "accounting user." Similarly, the west coast accountant user role can include the role template for "west coast user" and the role template for "accounting user." In this example, all east coast users require Application X, and all west coast employees require Application Y, but all accountants, independent of location, require Application Z. By combining the role templates "east coast user" and "accounting user" for an east coast accountant, the corresponding installation operating system is automatically associated with Application X and Application Z.

Figure 2:
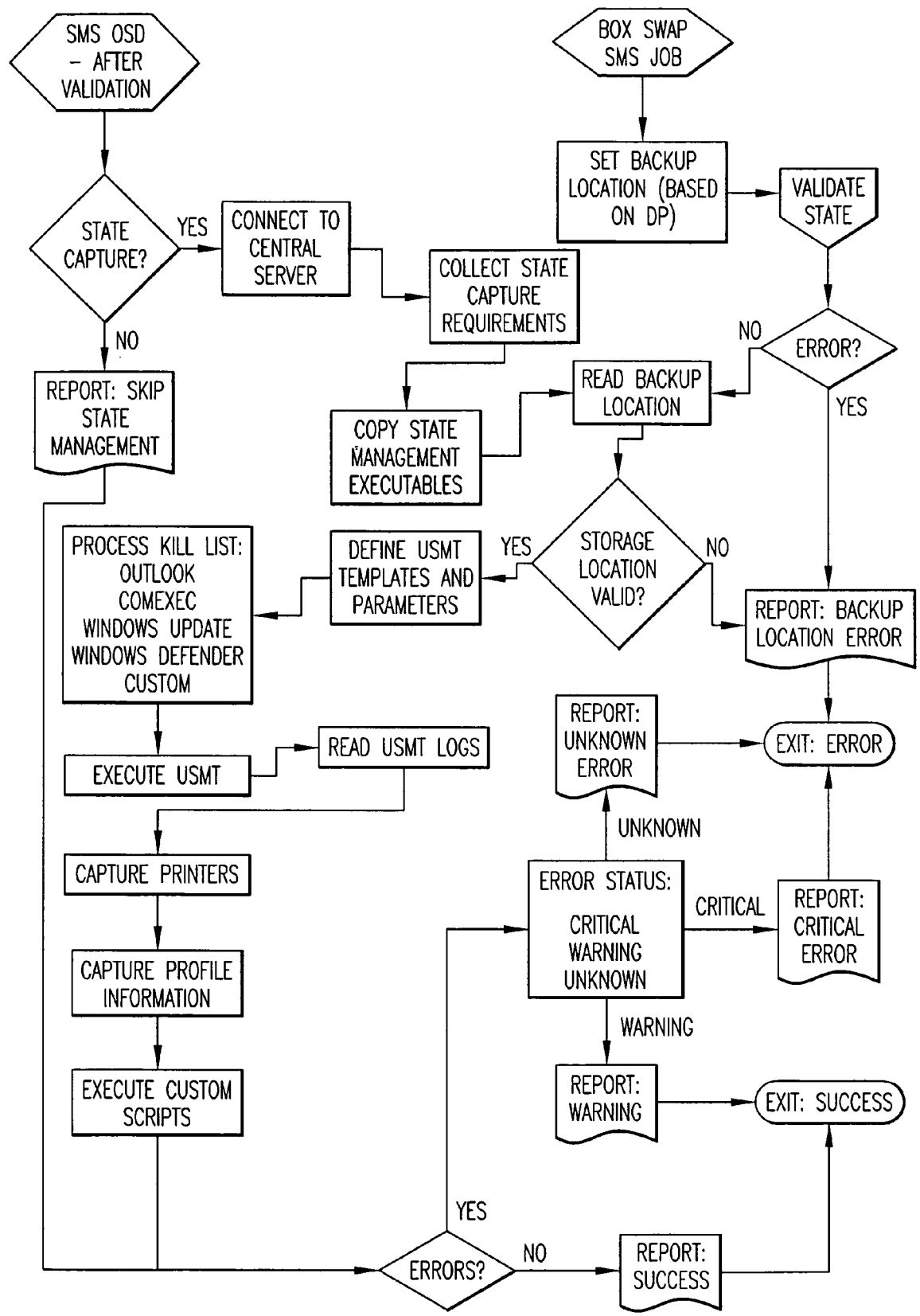
FIGS. 2-7 are flow diagrams illustrating various preferred aspects of the method illustrated in FIG. 1.

In addition to needing the correct applications with the deployed new operating system, each user is likely to have personalized data and/or settings on the user's data processor. A user's environment, including application settings, look-and-feel settings, and data on a data processor is referred to as the "user state." The process of saving data and settings is referred to as "state management." In box 28, the automated OS deployment process captures, e.g., stores, a user state for each of the plurality of data processors for reloading on the corresponding data processor with the installation of the new operating system on the data processor. Desirably, the disk image for a data processor is loaded onto the data processor before the reloading of the user state. FIG. 2 illustrates a flow diagram for a state capture according to one embodiment of this invention.

In box 30, once the installation operating system is completed and the user state has been captured, the method of this invention next automatically deploys the new operating system to the target data processor. The deployment includes transferring the installation operating system, including the disk image, the application information, etc., onto the target data processor. An image manager functionality is desirably included to remove any target data processor identifiers to allow the image to be reused for the next data processor.

Figure 3:
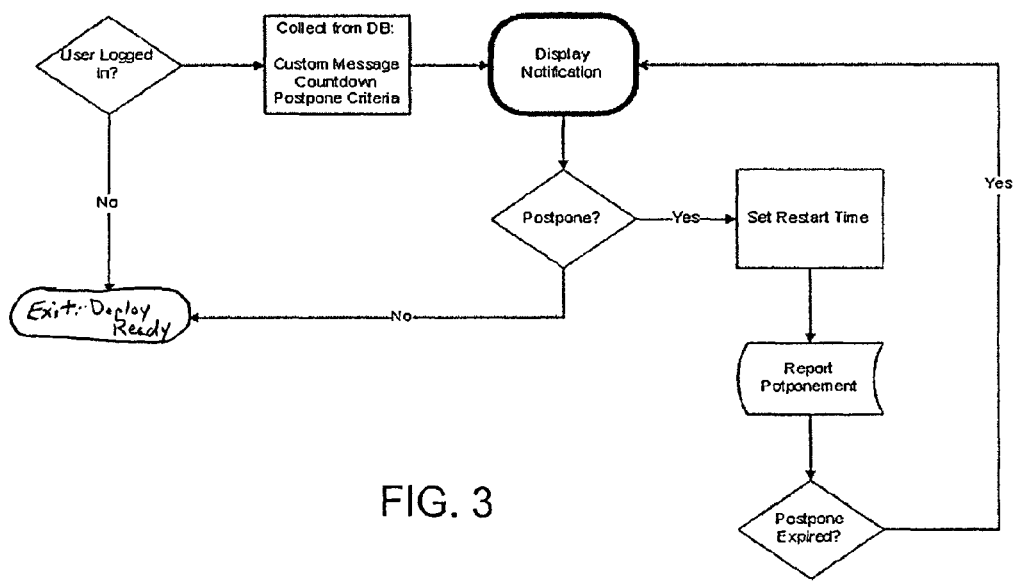

In one embodiment of this invention, the automated deployment system includes a notification functionality that assesses whether the user of the target data processor is using the data processor at the time of intended final installation of the new operating system. As shown in FIG. 3, if the user is logged in on the data processor, the server asks the user whether the deployment should be postponed. If the user is not logged in, the deployment can proceed.

The deployment steps desirably follow an escalation of testing prior to a full deployment rollout. This testing can include deploying to lab or non-production computers first. In many cases, a test pilot starts with groups comprised of members of the IT department. Finally, if the pilot is deemed a full success, the final deployment can be moved to production.

Figure 4:
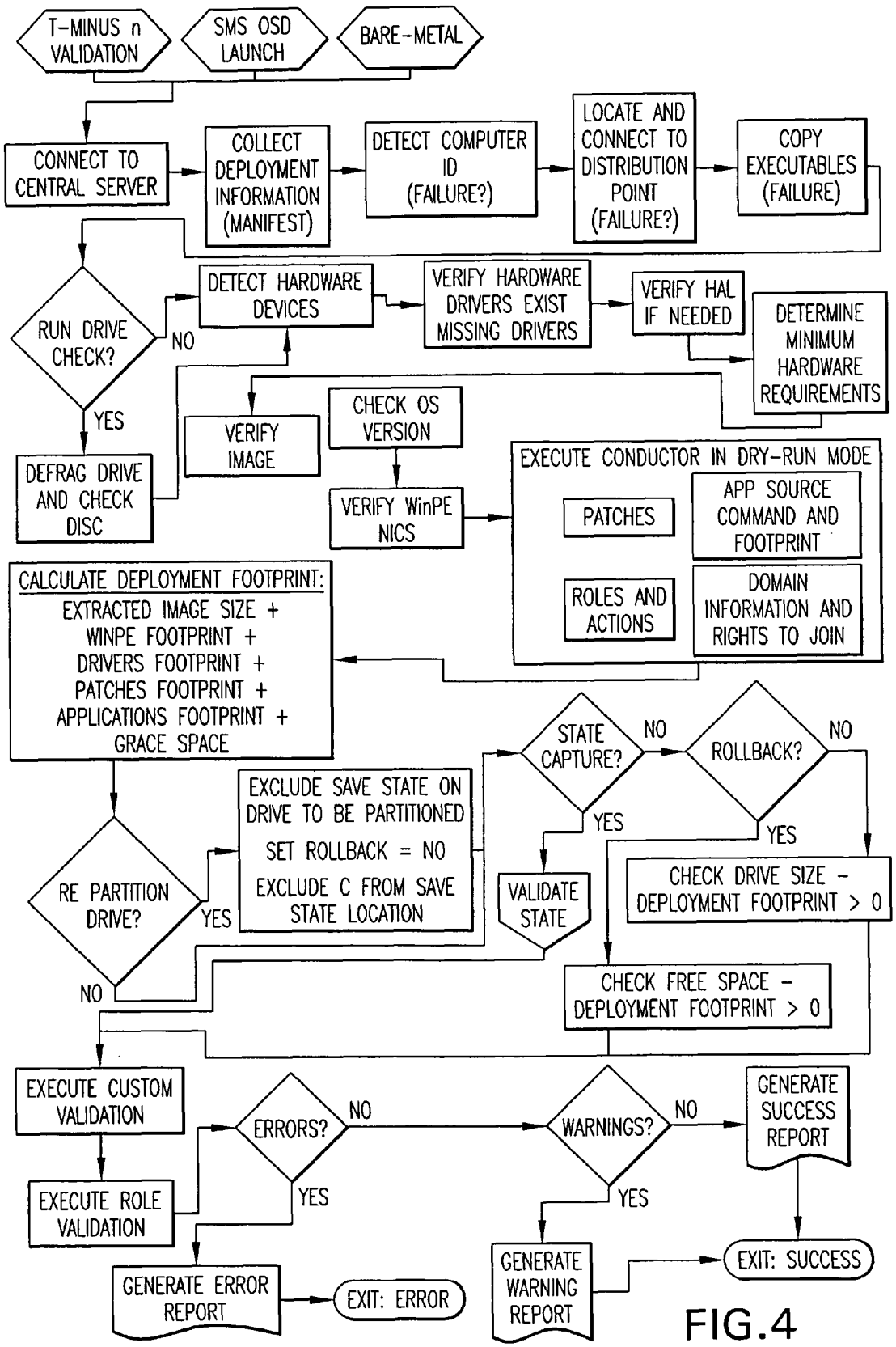
Figure 5:
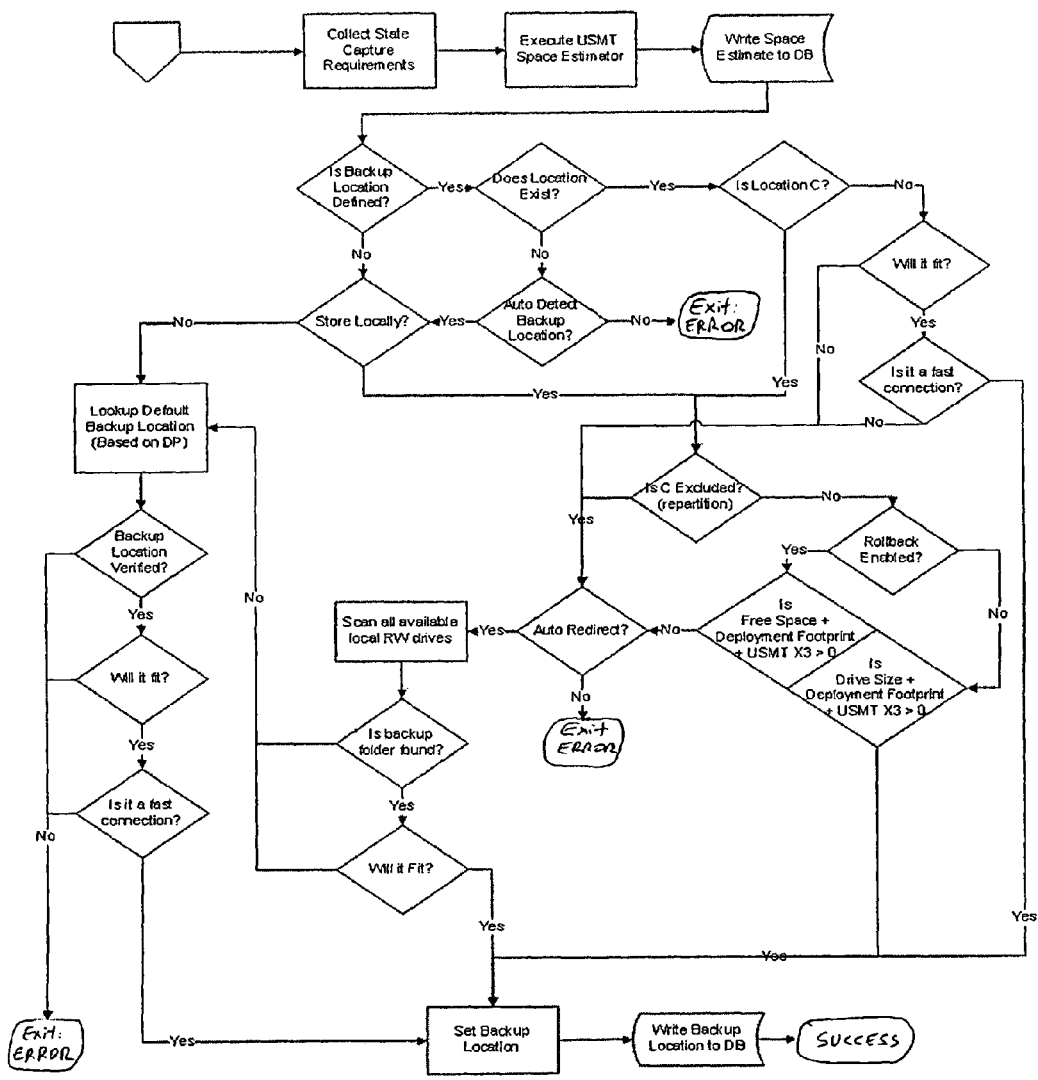
Figure 6:
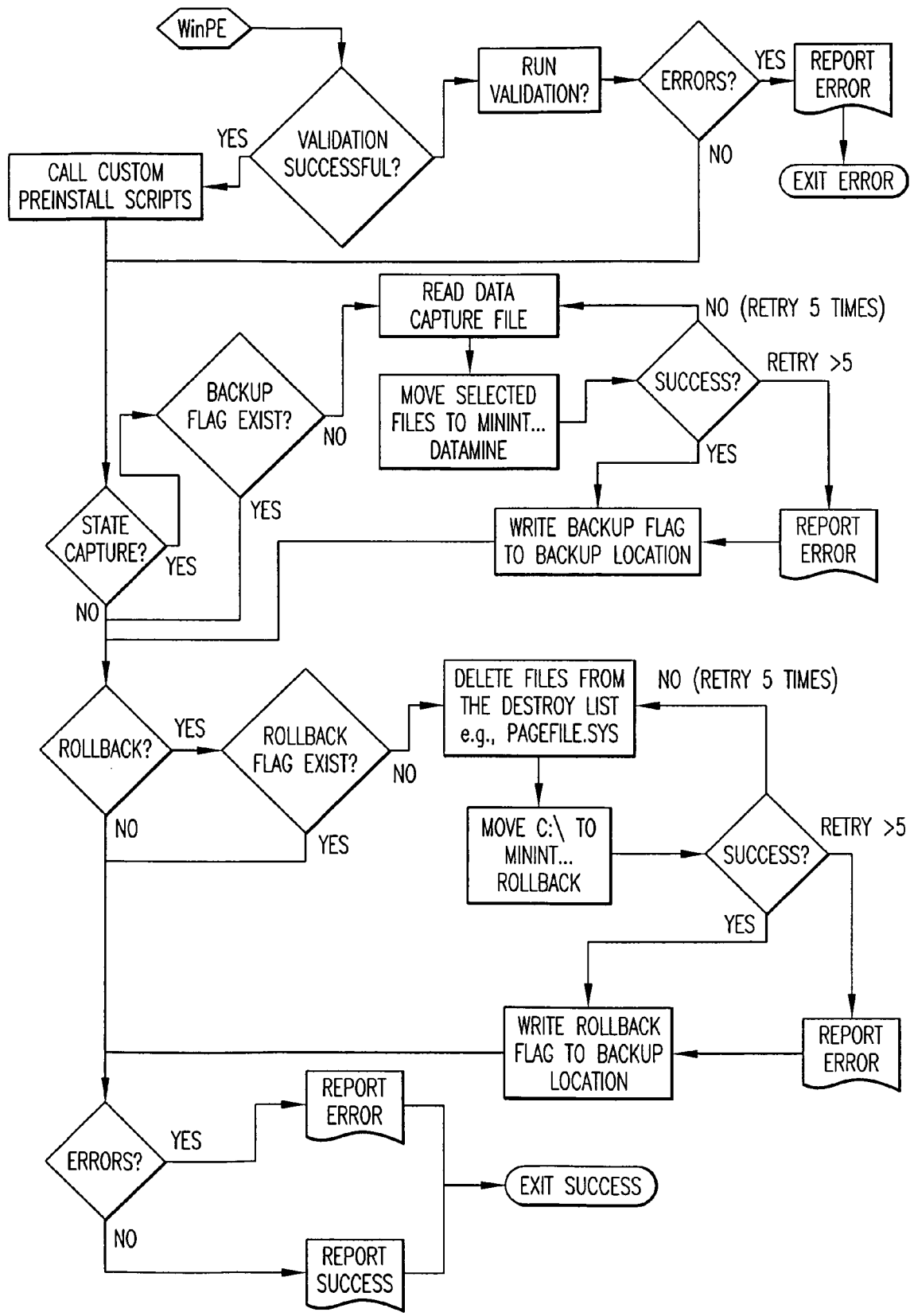

A validation functionality, such as illustrated by the exemplary flow chart of FIG. 4, is desirably executed by the automated deployment process before installation of the new operating system on the target data processor. The validation functionality checks the hardware and the software requirements. In addition, the validation functionality ensures the image is ready, the appropriate drivers are chosen, and any patches have been obtained. FIG. 5 illustrates an exemplary validation process of the user state for the data processor. FIG. 6 illustrates a preinstall functionality that is launched once the validation process is complete.

Figure 7:
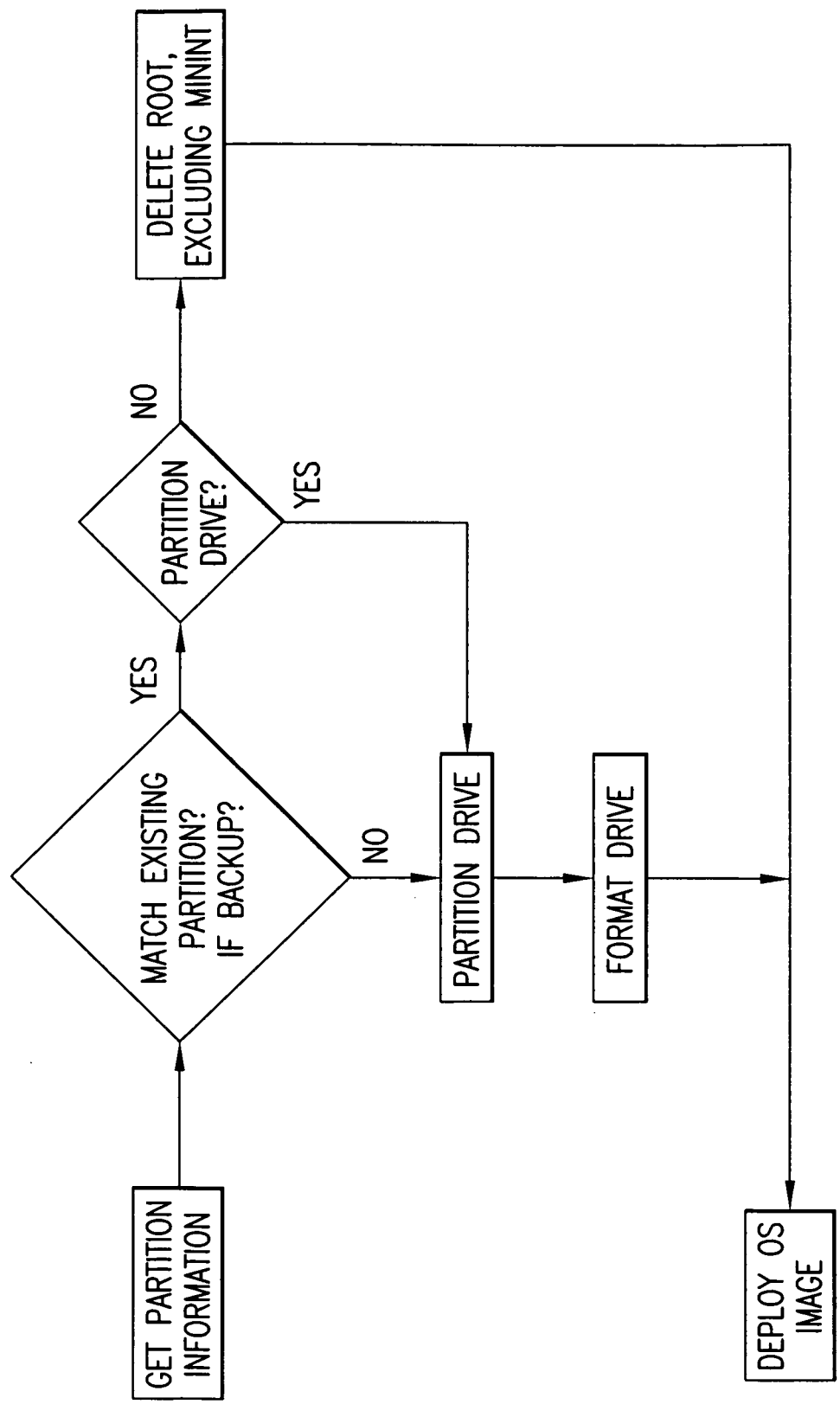

FIG. 7 illustrates steps during the new operating system installation. The automated process checks the receiving hard drive, and if necessary partitions and/or formats the hard drive for receiving the new operating system. After the hard drive is ready, the installation operating system is installed on the drive, desirably beginning with the disk image and followed by the applications and hardware drivers.

In one embodiment of this invention, the automated operating system deployment communicates with the end user. The communication desirably informs the end use when the operating system deployment will occur. Once the deployment is scheduled, electronic messages can automatically be sent to advise the end user when the deployment will occur. One or more messages can be sent at predetermined time periods before the final operating system installation, such as an initial advisement at 30 days prior, a reminder 15 days prior with an advisement of what will be contained in/with the new OS, and a further reminder the day before the final installation. Furthermore, a post-install message can be sent to obtain a quality review survey.

The method of this invention is desirably an automated software-driven application. However, the administrator in charge of the new operating system deployment will likely desire reports and may want to have a final decision in requesting the next stage of the automated process to commence. Therefore, the method and software of this invention desirably includes an orchestrator functionality that automatically requests administrator approval to proceed with steps during deployment of the new operating system and also automatically tracks decisions that are made during the deployment of the new operating system. The administrator approval is not required for each step of the method, but may be desirable as a final approval to proceed with the next stage of the deployment, thereby starting the automated steps of the next stage of deployment.

The method and software of this invention provides the benefit of a fully automated approach to OS deployment that is more time and cost efficient, as well as being more consistent with reduced errors. This invention reduces the initial cost of deployment as well as the on-going costs of managing and maintaining the desktop.

In one embodiment, the present invention provides an automated OS deployment process for use with data processors, e.g., computers, having encrypted data stored on a recordable medium, such as a hard drive. The method of this invention provides an automated process by which the encrypted data is included in the disk image and the deployment of the new operating system without decrypting the data. The method of this invention renders obsolete the conventional manual process of decrypting the data (either an entire disk or an individual file on a disk) for creating a disk image and then re-encrypting the data after deployment of a new operating system.

Figure 8:
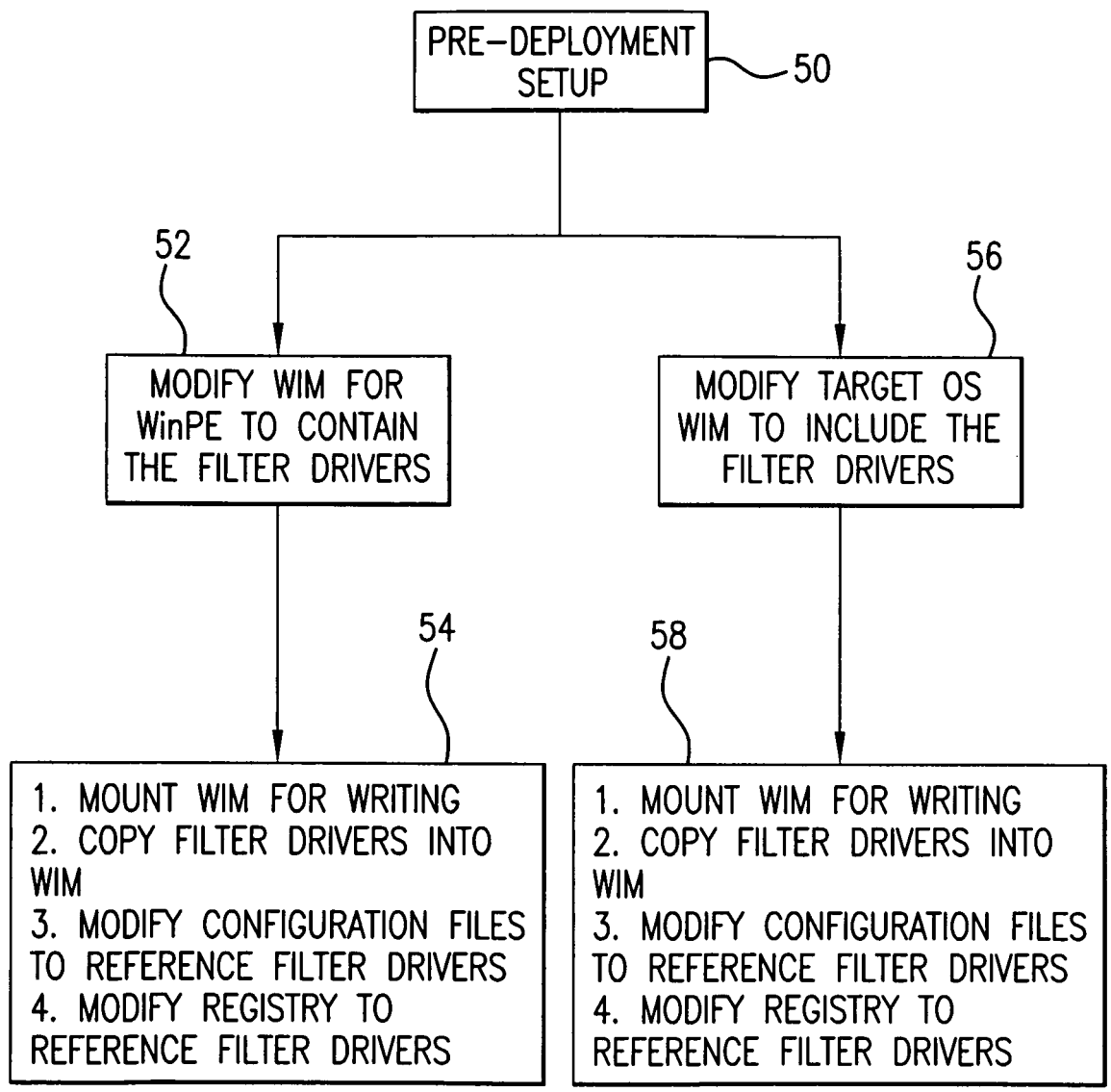
FIG. 8 is a flow diagram illustrating a method of yet another embodiment of this invention.

FIG. 8 is a general flow diagram of a method deploying a new operating system on a data processor having a recordable medium including encrypted data, according to one embodiment of this invention. In FIG. 8, box 50 includes several pre-deployment activities. The data processor is analyzed, and encrypted data is identified. As used herein, references to "encrypted data" include entire disks or drives that are encrypted, or one or more encrypted files on a disk or drive.

In order to copy the encrypted data according to this invention, one or more drivers for the encryption algorithm are required. The drivers are generally available from the encryption algorithm producer. One such digital encryption, named POINTSEC, is available from Check Point Software Technologies Ltd. (Tel Aviv, Israel) for providing data protection on laptops, PCs, mobile devices and removable media. However, the method of this invention is not limited to any one digital encryption. Other exemplary encryption algorithms are sold under the names SECUREDOCS and BITLOCKER.

In FIG. 8, the automated OS deployment process creates an installation operating system, as discussed above, desirably remote from the data processor on a second data processor, such as a server, that is in communication with the data processor. The installation operating system includes a disk image of the data processor in a preinstallation environment.

In box 52, the disk image is opened and modified to be able to accept the encryption driver. In box 54, a driver is copied into the disk image. Also, in box 54, text files and registry files of the installation operating system are modified as needed to reference the driver. With the driver installed in the installation operating system, the encrypted data can be included in the disk image without any need to decrypt before moving the data to the disk image.

In boxes 56 and 58, the new operating system is desirably, but not necessarily, concurrently being modified to include the encryption driver. In box 56, the new operating system is opened and modified to be able to accept the encryption drivers. In box 58, similar to box 54, a driver is copied into the new operating system. Also, in box 58, text files and registry files of the new operating system are modified as needed to reference the at least one filter driver. With the drivers installed in the new operating system, the encrypted data can be deployed from the installation operating system to the data processor with the new operating system, again without decrypting the data. The new operating system is installed on the data processor including the encrypted data together with the necessary driver.

Figure 9:
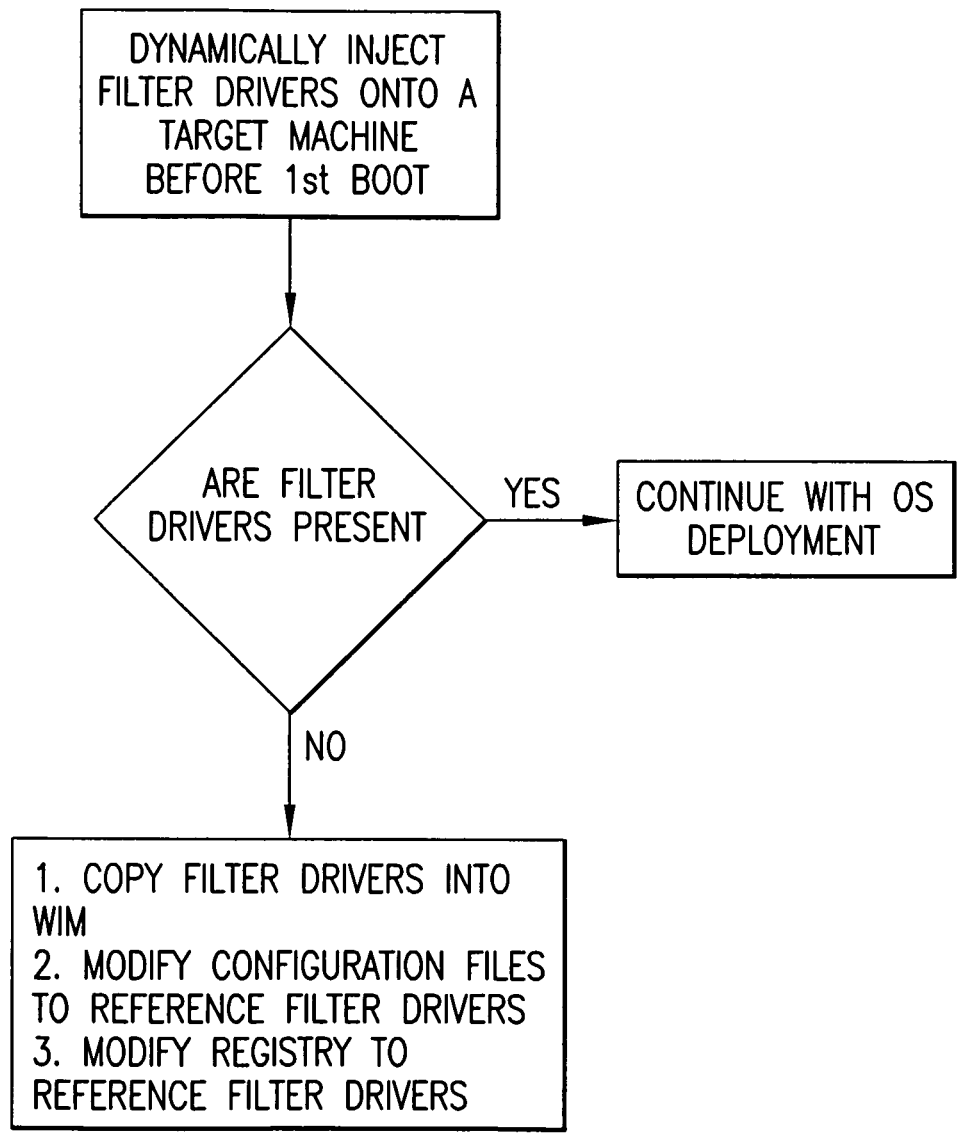
FIG. 9 is a flow diagram illustrating a method of another embodiment of this invention.

In the embodiment of FIG. 9, the drivers are dynamically injected onto the data processor during deployment of the new operating system on the data processor before the first boot of the operating system. In this way, the drivers are not applied to the disk image, but installed with the disk image during deployment.

Thus, the invention provides a method of deploying a new operating system. The method of this invention is desirably automated, being implemented fully by software. In one embodiment, the software is being executed on the remote server that is controlling the deployment of the new operating system on several end-user data processors networked with the server.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of deploying an operating system on a data processor having a recordable medium including encrypted data, the method comprising:
 identifying at least one driver for an encryption algorithm used to encrypt the encrypted data;
 creating an installation operating system including the encrypted data and the at least one driver;

modifying the operating system to include the at least one driver; and installing the operating system with the at least one driver and the encrypted data on the data processor;

wherein the encrypted data remains encrypted throughout the method on the data processor.

2. The method according to claim 1, wherein the deployment process includes the creating, modifying, and installing steps.

3. The method according to claim 1, wherein the at least one driver is obtained from the provider of the encryption algorithm.

4. The method according to claim 1, wherein the installation operating system comprises a disk image.

5. The method according to claim 1, wherein the installation operating system is located on a server remote from and in communication with the data processor.

6. The method according to claim 1, wherein creating an installation operating system comprises creating a preinstallation environment.

7. The method according to claim 6, further comprising:
opening a disk image of the preinstallation environment for modification; and
copying the at least one driver into the disk image of the preinstallation environment.

8. The method according to claim 7, further comprising modifying a text file of the disk image of the preinstallation environment to reference the at least one driver.

9. The method according to claim 7, further comprising modifying a registry file of the disk image of the pre installation environment to reference the at least one driver.

10. The method according to claim 1, wherein modifying the operating system to include the at least one driver comprises:
copying the at least one driver into the operating system;
modifying a text file of the operating system to reference at least one filter driver; and
modifying a registry file of the operating system to reference the at least one filter driver.

11. Software recorded on a non-transitory computer readable medium and executable on a data processor for implementing the method of claim 1.

12. A method of deploying an operating system on a data processor having a recordable medium including encrypted data, the method comprising:
identifying at least one driver for an encryption algorithm used to encrypt the encrypted data;
creating a preinstallation environment with a disk image including the encrypted data and the at least one driver;
opening the disk image of the preinstallation environment for modification;
copying the at least one driver into the disk image of the preinstallation environment;
copying the at least one driver into the operating system; and
installing the operating system with the at least one driver and the encrypted data on the data processor;
wherein the encrypted data remains encrypted throughout the method.

* * * * *